United States Patent
Bross et al.

(10) Patent No.: US 11,237,818 B1
(45) Date of Patent: *Feb. 1, 2022

(54) AUTOMATED BACKWARD-COMPATIBLE FUNCTION UPDATES

(71) Applicant: Appian Corporation, McLean, VA (US)

(72) Inventors: Edward Bross, Reston, VA (US); Matthew Hillard, Reston, VA (US)

(73) Assignee: Appian Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/837,496

(22) Filed: Apr. 1, 2020

Related U.S. Application Data

(63) Continuation of application No. 15/995,552, filed on Jun. 1, 2018, now Pat. No. 10,620,937.

(51) Int. Cl.
G06F 9/44 (2018.01)
G06F 11/36 (2006.01)
(Continued)

(52) U.S. Cl.
CPC .............. *G06F 8/65* (2013.01); *G06F 8/30* (2013.01); *G06F 8/34* (2013.01); *G06F 8/38* (2013.01);
(Continued)

(58) Field of Classification Search
CPC ..... G06F 8/65; G06F 8/30; G06F 8/34; G06F 8/38; G06F 8/71; G06F 8/36; G06F 8/443;
(Continued)

(56) References Cited

U.S. PATENT DOCUMENTS 5,734,899 A 3/1998 Yoshizawa et al.
6,662,357 B1 * 12/2003 Bowman-Amuah ..... G06F 8/20
717/120

(Continued)

OTHER PUBLICATIONS

Jianhua Liu et al., A Mimo system with Backward Compatibility for OFDM-Based WLANs, 2004, [Retrieved on Aug. 3, 2021], Retrieved from the internet: <URL: https://dl.acm.org/doi/pdf/10.1155/S111086570431022X> 11 Pages (696-706) (Year: 2004).*

(Continued)

*Primary Examiner* — Anibal Rivera
(74) *Attorney, Agent, or Firm* — Fish & Richardson P.C.

(57) ABSTRACT

Systems and techniques are described to allow an ADP to be dynamically updated to provide backward compatibility with existing functions in a manner that both intuitive to user experience and provides advantages to the way in which computing systems implement updates to ensure that users with limited technical expertise can update applications. In some implementations, data indicating a first version of a function to be executed by applications developed on a post-update application development platform is obtained. A second version of the function that is associated with a pre-update application development platform is identified. An association between the first version of the function and the second version of the function is generated. A determination that an application developed using the pre-update application development platform is associated with the second version of the function is made. Data associated with the application developed using the pre-update application development platform is then adjusted.

18 Claims, 9 Drawing Sheets

(51) Int. Cl.
*G06F 8/65* (2018.01)
*G06F 8/38* (2018.01)
*G06F 8/30* (2018.01)
*G06F 8/71* (2018.01)
*G06F 8/34* (2018.01)
*G06F 21/62* (2013.01)
*G06F 9/451* (2018.01)
*G06F 8/41* (2018.01)
*G06F 8/36* (2018.01)
*G06F 9/30* (2018.01)
*G06F 9/445* (2018.01)
*G06F 9/54* (2006.01)

(52) U.S. Cl.
CPC .......... *G06F 8/71* (2013.01); *G06F 8/36* (2013.01); *G06F 8/443* (2013.01); *G06F 9/3001* (2013.01); *G06F 9/445* (2013.01); *G06F 9/451* (2018.02); *G06F 9/54* (2013.01); *G06F 9/541* (2013.01); *G06F 21/629* (2013.01)

(58) Field of Classification Search
CPC .......... G06F 9/451; G06F 9/3001; G06F 9/54; G06F 9/541; G06F 9/445; G06F 21/629; G06F 11/30; G06F 11/36
See application file for complete search history.

(56) References Cited

U.S. PATENT DOCUMENTS

| | | | | |
|---|---|---|---|---|
| 7,315,826 | B1* | 1/2008 | Guheen | G06Q 10/06 705/7.29 |
| 7,543,019 | B1* | 6/2009 | Cormier | G06F 9/541 709/203 |
| 7,600,219 | B2* | 10/2009 | Tsantilis | G06F 8/71 717/122 |
| 8,578,329 | B1 | 11/2013 | Chiluvuri | |
| 8,601,467 | B2 | 12/2013 | Hofhansl et al. | |
| 8,918,775 | B1* | 12/2014 | Carpenter | G06F 8/65 717/168 |
| 9,063,742 | B1 | 6/2015 | Bienkowski et al. | |
| 9,075,583 | B1 | 7/2015 | Cutter et al. | |
| 9,417,870 | B2* | 8/2016 | Bankole | G06F 8/65 |
| 9,430,200 | B1* | 8/2016 | Trofin | G06F 8/4435 |
| 10,339,299 | B1 | 7/2019 | Magnuson et al. | |
| 10,684,846 | B2* | 6/2020 | Ghiondea | G06F 9/44505 |
| 10,761,810 | B2* | 9/2020 | Ramakrishna | G06F 8/30 |
| 2003/0172196 | A1 | 9/2003 | Hejlsberg et al. | |
| 2004/0168153 | A1* | 8/2004 | Marvin | G06F 8/71 717/120 |
| 2005/0086642 | A1* | 4/2005 | Runte | G06F 8/71 717/122 |
| 2005/0132346 | A1* | 6/2005 | Tsantilis | G06F 8/71 717/168 |
| 2007/0264985 | A1 | 11/2007 | Kapur et al. | |
| 2007/0294680 | A1 | 12/2007 | Papakipos et al. | |
| 2009/0106350 | A1* | 4/2009 | Chen | G06F 9/54 709/203 |
| 2010/0306757 | A1* | 12/2010 | Becker | G06F 9/44536 717/170 |
| 2011/0072371 | A1 | 3/2011 | Segal et al. | |
| 2011/0231832 | A1 | 9/2011 | Dorn et al. | |
| 2012/0233600 | A1 | 9/2012 | Uno | |
| 2012/0246618 | A1* | 9/2012 | Schatz | G06F 8/71 717/122 |
| 2012/0266156 | A1 | 10/2012 | Spivak et al. | |
| 2013/0042231 | A1 | 2/2013 | Davey et al. | |
| 2013/0159984 | A1 | 6/2013 | Misovski et al. | |
| 2013/0167111 | A1* | 6/2013 | Moore | G06F 3/0481 717/105 |
| 2013/0174042 | A1 | 7/2013 | Kim et al. | |
| 2013/0174066 | A1 | 7/2013 | Felix | |
| 2014/0222553 | A1 | 8/2014 | Bowman | |
| 2014/0282371 | A1* | 9/2014 | Hirsch | G06F 8/65 717/106 |
| 2014/0337816 | A1 | 11/2014 | Chiluvuri | |
| 2015/0095899 | A1* | 4/2015 | Carpenter | G06F 8/65 717/168 |
| 2015/0128106 | A1 | 5/2015 | Halley et al. | |
| 2015/0169319 | A1* | 6/2015 | Ahmed | G06F 8/71 717/122 |
| 2016/0004515 | A1 | 1/2016 | Baeck et al. | |
| 2016/0004518 | A1 | 1/2016 | Sharma et al. | |
| 2016/0162286 | A1* | 6/2016 | Bankole | G06F 8/65 717/170 |
| 2016/0196135 | A1 | 7/2016 | Mavinakayanahalli et al. | |
| 2016/0321064 | A1 | 11/2016 | Sankaranarasimhan et al. | |
| 2017/0006135 | A1 | 1/2017 | Siebel et al. | |
| 2017/0091069 | A1* | 3/2017 | Fujiwara | G06F 8/65 |
| 2017/0123961 | A1* | 5/2017 | Cerny | G06F 9/3001 |
| 2017/0235662 | A1* | 8/2017 | Leask | G06F 11/3616 717/125 |
| 2017/0337052 | A1* | 11/2017 | Elkabany | G06F 8/71 |
| 2018/0095604 | A1 | 4/2018 | Nguyen et al. | |
| 2019/0042231 | A1* | 2/2019 | Kolhe | G06F 8/36 |
| 2019/0114165 | A1* | 4/2019 | Ghiondea | G06F 8/65 |

OTHER PUBLICATIONS

David Chisnail, Backward compatibility always trumps new features, 2012, [Retrieved on Aug. 3, 2021], Retrieved from the internet: <URL: https://dl.acm.org/doi/pdf/10.1145/2330087.2331170> 5 Pages (1-5) (Year: 2012).*

Weissman et al., "The Design of the Force.com Multitenant Internet Application Development Platform," Jun. 29-Jul. 2, 2009, [Retrieved on Dec. 2, 2019], Retrieved from the internet: <URL: http://cloud.pubs.dbs.uni-leipzig.de/sites/cloud.pubs.dbs.uni-leipzig.de/files/> 8 Pages.

Griss et al., "Integrating Feature Modeling with the RSEB," Aug. 6, IEEE, 2002, [Retrieved on Dec. 2, 2019], Retrieved from the internet: <URL: https://ieeexplore.ieee.org/abstract/docunnent/685732> 10 Pages.

* cited by examiner

410 ↴

Text Component

Text

Function: altextField_17r2()

Displays and allows entry of a single line of text. For a multiple line of text, use a paragraph component Old versions of this component exist

Parameters

| Name | Keyword | Type | Description |
|---|---|---|---|
| Label | label | Text | Optional text |
| Label Position | labelPosition | Text | Optional text to determine where the label appears. values include<br>- "ABOVE" (default) Displays the label above the component<br>- "ADJACENT" Displays the label to the left of the component<br>- "COLLAPSED" Hides the label. The label will be read by screen readers; see accessibility considerations for more information. |
| Alignment | align | Text | Alignment of the text value (except on mobile devices). Valid are "LEFT", "CENTER", and "RIGHT". Appian recommends setting the alignment when used in an editable grid component only |

412 ↴ (points to Label Position row)

Old Versions

Text Component v17.0

Notes

- Useful for displaying values of another type that require formatting other than the original type's default formatting.
- If *Ready-only* is set to TRUE, the component's value displays without a box around it.
- If you pass the same local variable to *Display Value* and *Save Input To* when *Read-only* is set to FALSE, you can use the user's input into the component to modify the interface, such as filtering a grid.
- Whether placeholder text clears on focus or input varies by device and browser. Placeholder text does not display on Brower Application

FIG. 4A

All Functions

A new version of the Platform is available! Update now to take advantage of the latest features in Platform 17.2

The following table is a searchable listing of all functions        [All ▼]  [Search name]

| Name | Example | Result |
|---|---|---|
| > Array | Used within your expressions to manipulate, insert, and/or select values from arrays. | |
| a!flatten() | a!flatten(merge({1,2}, {11,12})) | {1, 11, 2, 12} |
| append() | append({10, 20, 30}, 99) | {10, 20, 30, 99} |
| index() | index({10, 20, 30}, 2, 1) | 20 |
| insert() | insert({10, 20, 30, 40}, 99, 1) | {99, 10, 20, 30, 40} |
| joinarray() | joinarray({1, 2, 3, 4}, "|") | 1|2|3|4 |
| joinarray_v1() | joinarray({1, 2, 3, 4}, "-") | 1-2-3-4 |

FIG. 4B

AUTOMATED BACKWARD-COMPATIBLE FUNCTION UPDATES

CROSS-REFERENCE TO RELATED APPLICATION

This application is a continuation of U.S. application Ser. No. 15/995,552, filed Jun. 1, 2018, now U.S. Pat. No. 10,620,937, which is incorporated by reference in its entirety.

TECHNICAL FIELD

This specification generally relates to application software.

BACKGROUND

Application development platforms (ADPs) commonly represent software that enable users to design, develop, and build software applications to execute certain functions. For example, enterprise ADPs allow users to build enterprise applications that perform functions relating to enterprise business operations, such as transaction report generation, collaborative capabilities, process automation, and event monitoring. Examples of applications include a word processor, a spreadsheet, an accounting application, a web browser, among others.

SUMMARY

Many ADPs include toolkits that enable users to build applications that run on the platform. Such toolkits often provide a higher ease of use in building software capabilities compared to programming language used to build logic. For instance, enterprise ADPs allow business users, i.e., users with limited software engineering experience, to build applications using, for example, a library of functions that each operate as a functional building block to perform a capability without having knowledge of the programming language used by computing systems to execute the capabilities. Toolkits therefore allow a user to build an application to perform a capability without significant knowledge of programming principles that underlie the capability.

ADPs are often updated and disseminated in release versions to, for example, provide new capabilities, improve existing capabilities, or fixing known issues that users have experienced during use. As an example, a new release version of an ADP can improve upon an existing function to enable compatibility with data types not previously capable of being used with the function. Often times, ADP updates can be tracked using a software versioning process that assigns unique version names and/or version numbers to unique states of the ADP. Revision control can also be used to keep track of incrementally different versions of the same functions between different versions of the ADP.

However, changes to many ADPs, e.g., through a platform upgrade, can sometimes cause compatibility issues if, for instance, a user designs an application on a previous release of the ADP and then attempts to run the application on a newer version. For example, an existing application may involve executing a function that has been changed and/or updated in the newer version. In this example, unless the ADP provides retroactive (or backward) compatibility, a user may be required to manually update existing applications each time he/she updates to a new version of an ADP through which the applications are designed, built, and executed. In some instances, users access an ADP through a web-based user interface so that version upgrades are automatically implemented without providing a user with an option to opt out of the version upgrades. In such instances, it is important that new releases of an ADP do not break existing functionalities.

The present disclosure describes systems and techniques that provide improvements to ADPs to address compatibility problems that often result when an ADP is updated with a new release version and users continue to execute legacy applications that were built on prior release versions of the ADP. As discussed below, the technology described addresses this problem with a function transformation process that ensures that an ADP remains easily usable by a user with limited technical experience, so that the process provides a mechanism to further the capabilities of the ADP without compromising its purpose to allow users to develop applications without specific programming knowledge or expertise.

The function transformation process discussed herein enables a computing system of an ADP to automatically identify legacy applications of the ADP to be modernized to reference updated versions of functions that are included in a new release of the ADP. The modernization can often result in applications being provided with new capabilities not previously performable, e.g., compatibility with a new data object or data type, performance enhancements, e.g., improved resource allocation while an application is being executed, or improved operability with a new computing architecture specified by the new release. Moreover, because ADPs are often used to allow unsophisticated users to build applications without writing or maintaining source code (or using other types of programming knowledge), the techniques discussed herein can be used to simplify the procedure for modernizing a legacy application. This ensures that new releases of the ADP are handled to maintain the purpose of the ADP, e.g., providing a low-code platform, in manner that places minimal burden on users.

The technology described in the present disclosure also allows an ADP to be dynamically updated to provide backward compatibility with existing functions in a manner that reduces the complexity of updating applications to incorporate new capabilities through the software process. Users can run an existing application on a new version of an ADP without being required to re-build the application to be compatible with the new version. In some instances, users are provided with options to improve an existing application by incorporating a new version of existing function that then provides additional or improved capabilities of the existing application. As discussed below, the systems and techniques described herein can be used to ensure that the transition between releases of an ADP is smooth and reduces user burden.

To provide backward compatibility, the system generates and manages a function transformation that enables the ADP to provide dynamic version controlling of functions between different versions of the ADP. For example, with each new version of the ADP, the system can identify any changes/updates to existing functions that were included in prior version of the ADP. The system can then generate data structures for new versions of existing functions and update the function transformation to include the generated data structures. The system can then develop associations between different versions of the same function within the function transformation to more easily identify outdated versions of functions of applications running on the new version of the ADP. In some instances, the system provides users with options to upgrade an application with minimal input to improve ease-of-use when upgrading an existing application to run on a new version of the ADP.

The technology discussed within the present disclosure can be used to provide various advantages to computing systems associated with ADPs. As an example, the technology can be leveraged to improve revision control of functions between different versions of an ADP. For example, by maintaining a function transformation in tandem with a function repository, the system can more easily identify applications that run on the platform but execute prior versions of a function and may, for example, exhibit performance enhancements, e.g., lower processing requirements, improved memory allocation, if updated to incorporate a new version of the function. In some instances, the system can use the function transformation to identify a predicted performance enhancement that may result if an existing application with an outdated version of a function is updated to incorporate the up-to-date version of the function. In such instances, the system can provide a notification to a developer of the application to upgrade the application so that the user is informed about the update process.

Additionally, the technology discussed herein enables a computing system to more efficiently and effectively provide backward compatibility through the software versioning process of an ADP. For example, the system can manage a dynamic function repository that tracks not only different functions that are available for development through the platform but also different versions of the same function that were introduced into the platform during different releases. As an example, the repository can include an entry for "function" for a version of a function that was introduced in release version "v0" of the platform and an entry for "function_v1" for an updated version of the function that was introduced in release version "v1" of the platform. Because the function repository captures different instances of the same function, the system is capable of identifying and improving applications on the platform with minimal or no manual user intervention, thereby reducing the complexity of updating applications to incorporate new capabilities through the software process. This ensures that the application and/or ADP update process is consistent with the purpose of an ADP to allow unsophisticated users with limited technical expertise or knowledge to build and maintain applications through the ADP. The use of the function repository thereby enables the system to provide a technical solution to a technical problem of providing an updating process that requires limited sophistication of its users to take advantage of the updating process.

The technology discussed herein also enables a system to more efficiently provide new application capabilities within a new version of a platform while preserving and maintaining prior capabilities developed using older versions of the platform. In this respect, if a change to an application to incorporate a new version of a function, i.e., the change involves more than a simple find-and-replace of function references, then the system enables the user to retain use of the application using the older version of the function while enabling other users to develop similar applications using the new version of the function. This dual capability of the system allows legacy applications to run in the same environments as newly developed applications. As discussed below, in some implementations, this can be accomplished by generating backend function associations, e.g., associations between different versions of functions, that reconfigure the execution of an existing application but maintain performance and execution from the user's front-end perspective. The system can also shield the user from the complexity of underlying coding and programming, which is consistent with the desire to have the ADP be usable by unsophisticated users.

For example, if a prior version of a function within an application references a data structure that has been removed in a new version of the platform (which is then adjusted in a new version of the function), then the system can generate an association between versions of the function. The association can identify executable fixes that enable the prior version of the function to run in the new version of the platform without generating errors. Once a user executes the application, the system identifies the prior version of the function, uses the association to perform the executable fixes so that the application can operate without any errors. In this example, while the backend operations performed in executing the application have been adjusted to provide compatibility with the new release of the platform, a user perceives the execution of the application as being performed without any adjustments. In other examples, users may be prompted to implement upgrades to an application using newer versions of a given function, which, upon receiving a user's indication to implement the upgrades, can be performed by the system with minimal or no further human intervention. In this regard, the techniques described herein can enable a simplified upgrade process for applications developed on earlier versions of the platform so that it can be used by users with limited technical expertise.

Moreover, the technology disclosed herein can be used to provide various improvements to the operation of computing devices that support the infrastructure of an ADP. For example, a new release of an ADP can employ a change to the platform infrastructure that is intended to provide performance enhancements to client systems that access the ADP, e.g., reduced application loading time, increased database query throughput, larger number of database object references in a single application. In this example, while an updated version of a function that is included in the new release can be configured to take advantage of these performance enhancements, legacy versions of the function may rely upon a legacy infrastructure to accomplish a similar or identical task. The techniques disclosed herein therefore can be used to realize improvements in computing capabilities that can result if legacy applications are modernized to utilize the infrastructure advancements of ADP. For instance, if network performance over through the platform is bottlenecked by legacy applications that incorporate legacy versions of functions, the techniques disclosed herein enable users to update applications with reduced risk of failure or performance degradation and without requiring the user to specifically recognize how the improvements could be implemented. For example, instead of requiring a user to modify the source code of an application to incorporate an upgraded version of a function, the application can update an application to incorporate a current version of a function using a function transformation that includes a mapping between a data object referencing versions of a function and source code associated with the versions of the function.

The technology described herein can also be used to detect potential functional defects associated with obsolete code, i.e., code of legacy applications that incorporates an outdated version of a function. For example, if a user fails to update a legacy application once a new release of the ADP is released, the system can evaluate whether the legacy application running on the new release will cause issues, such as sluggish performance, inefficient resource allocation, among others. In this example, if performance defects are detected for the legacy application are identified, then the system can provide visual indicators and/or instructions for the user to update the application to incorporate an updated version of a function as discussed below. In other examples, the system can identify other types of functional defects, such as potential security issues.

Moreover, the techniques described herein can be used to improve the likelihood that users will actually update legacy applications that run on the ADP through new release versions. In particular, because users of the ADP often have limited technical expertise in software engineering and programming, users often opt to avoid the update process to maintain current application functionalities and prevent risk of breaking these functionalities. To address this problem, the system employs a set of non-obtrusive techniques to provide release information to users about potential upgrades without potentially breaking application functionality that the user has built using prior releases of the ADP. For example, the system can display a notification through an interface that the user uses to build an existing application to visually indicate that an update to an existing function of the application is currently available. The notification can be used to provide the user with a sense of the benefits they would receive for the cost of refactoring to the upgrade.

In one aspect, a computer-implemented method can include a set of operations. The operations can include obtaining, by a server system, data indicating a first version of a function to be executed by applications developed on a post-update application development platform. The post-update application development platform can be updated using an update and enables user interfaces that permit a user to build an application by specifying relationships between visual development tools. The operations can also include identifying, by the server system and based on the update, a second version of the function that is associated with a pre-update application development platform. The pre-update application development platform can be a version of the application development platform prior to the update. The operations can further include generating, by the server system, an association between the first version of the function and the second version of the function, determining, by the server system, that an application developed using the pre-update application development platform is associated with the second version of the function, and adjusting, by the server system and based on the association between the first version of the function and the second version of the function, data associated with the application developed using the pre-update application development platform.

One or more implementations can include the following optional features. For example, in some implementations, the association indicates, for each version of the function, a display format, a storage format, and one or more execution parameters. The display format represents a text string displayed on a user interface for configuring the application that is provided for output on a computing device of a user. The storage format represents source code associated with instructions executed by the server system in performing the function in association with running the application.

In some implementations, generating the association between the first version of the function and the second version of the function includes generating an association between a display format of the first version of the function and a display format of the second version of the function. In such implementations, adjusting the data associated with the application developed using the pre-update application development includes adjusting the user interface such that text strings associated with the second version of the function that are displayed on the user interface are associated with a notification.

In some implementations, the notification includes a link that, when selected by the user, directs the user to a webpage associated with the first version of the function.

In some implementations, the notification includes a selectable option that, upon selection by the user, causes the server system to adjust the application such that instances of the storage format of the second version of the function in the application are replaced with the storage format of the first version of the function.

In some implementations, the visual development tools include at least one of drag-and-drop modelers or point-and-click interface creation tools.

In some implementations, the user interfaces enabled by the post-update application development platform permit the user to build the application without writing source code for the application.

In some implementations, the interfaces that permit the user to build the application comprises a designer interface that permits a user to specify relationships between visual data objects associated with the application. The designer interface displays a visual data object that references the second version of the function. Additionally, adjusting the data associated with the application includes adjusting the visual data object such that the visual data object references the first version of the function.

In some implementations, the operations of the method further include generating, by the server system and in response to obtaining the data indicating the first version of the function, a data structure for the first version of the function. The data structure includes a display format for the first version of the function, a storage format for the first version of the function, and execution parameters for the first version of the function. The operations also include accessing, by the server system, a function repository of the application development platform. The function repository includes a data structure for each function to be executed by applications developed on the post-update application development platform. Each data structure includes a display format for a particular function, a storage format for the particular function, and execution parameters for the particular function. The operations also include updating, by the server system, the function repository to include the data structure generated for the first version of the function.

In some implementations, the updated function repository includes a first data structure for the first version of the function and a second data structure for the second version of the function.

Other versions include corresponding systems, and computer programs, configured to perform the actions of the methods encoded on computer storage devices.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

FIG. 4A illustrates an example of a user interface that allows a user to access information for an updated version of an existing function in a new version of an ADP.

FIG. 4B illustrates an example of a user interface that displays a list of functions stored in a function repository.

In the drawings, like reference numbers represent corresponding parts throughout.

DETAILED DESCRIPTION

Figure 1:
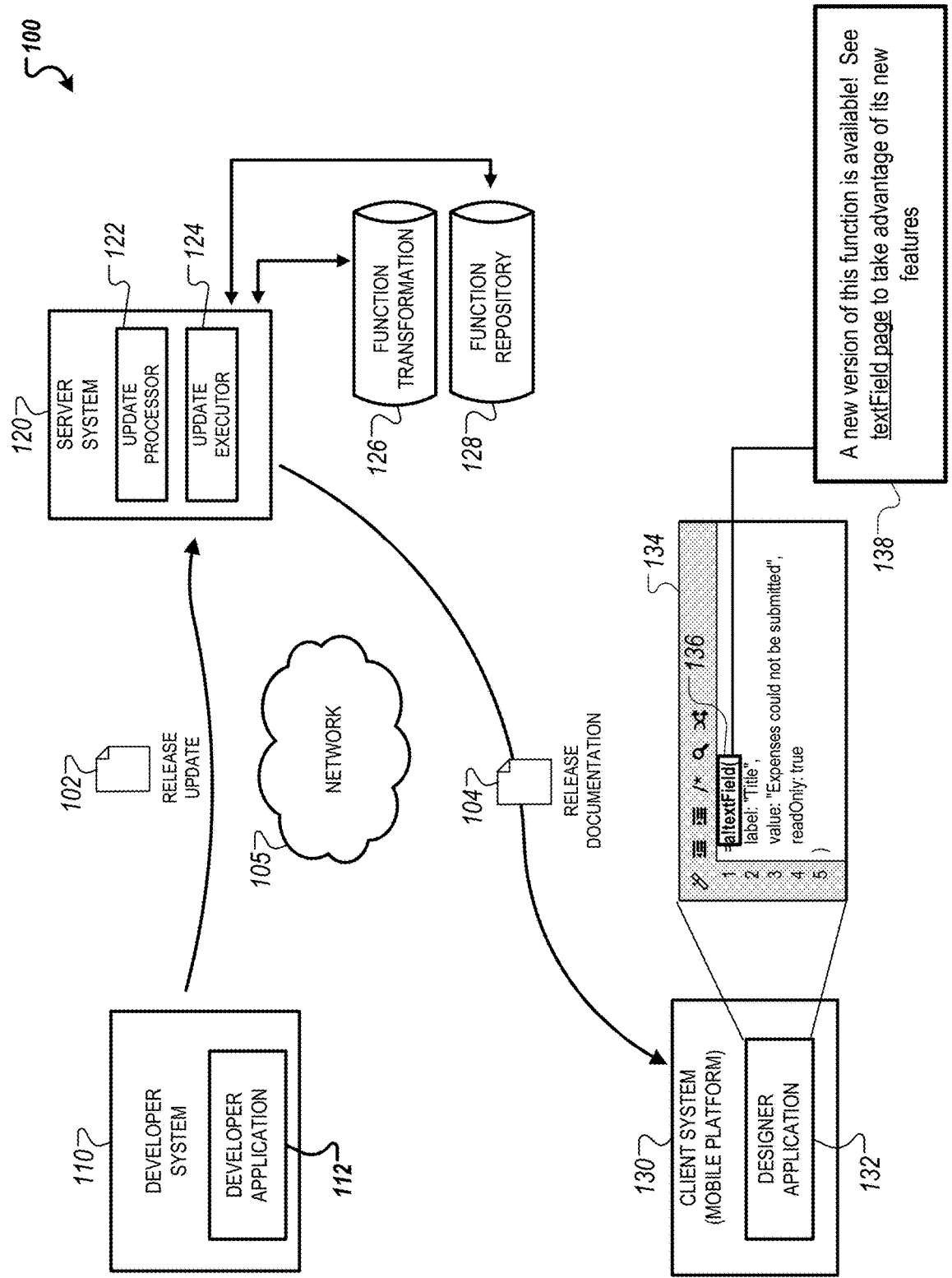
FIG. 1 illustrates an example of a system that is capable of software versioning an ADP.

In general, the present disclosure describes systems and techniques that allow an ADP to be dynamically updated to provide backward compatibility with existing functions in a manner that both intuitive to user experience and provides advantages to the way in which computing systems implement software updates to ensure that users with limited technical expertise can update applications through the ADP. Users can run an existing application on a new version of an ADP without being required to re-build the application to be compatible with the new version. In some instances, users are provided with options to improve an existing application by incorporating a new version of existing function that then provides additional or improved capabilities of the existing application. As discussed below, the systems and techniques described herein can be used to ensure that the transition between releases of an ADP is smooth and reduces user burden.

As discussed herein, a "function" refers to an operation or a command that is executed by a computing device to perform some specified task defined by the function. For example, a "delete( )" function within a word processor refers to erasure of a typed word within a document. The requirements of a function are defined by an expression that specifies, for example, elements associated with the function. For example, a function can be defined based on properties of inputs and outputs, requirements for outputs, or criteria for executing tasks specified in the expression.

As discussed below, the definition, specification and/or requirements of a function can be changed between different versions of an ADP to improve existing capabilities, e.g., improve processing efficiency in handling a data object, or provide new capabilities, e.g., compatibility with a new type of data object. In this regard, different versions of functions can represent alternative techniques to perform the same underlying task, operation, or set of operations. In some instances, an updated version of a function can represent an improved technique to perform an operation in a more computationally efficient fashion, e.g., reduced processing requirements for performing the operation. In such instances, if an application involves executing a certain function, the application can be updated to incorporate an updated version of the function to provide improvements to the computing device that runs the application.

As discussed herein, an "application" refers to any operation, or group of operations, that are designed for use by an end-user. Applications can include database programs, word processors, web browsers, and spreadsheets, among others. As discussed below, an application can be developed through an ADP and can represent a collection of interfaces, processes, rules, and data objects that work together to execute associated operations. For example, an enterprise application can be executed to provide a business functionality, such as creating a transaction report.

Users can build and configure applications through interfaces enabled by the ADP. For example, users can use the interfaces to build applications by specifying relationships between visual development tools that simulate programming logic for source code of an application. As an example, the visual development tools can include a drag-and-drop modeler that allows users to build dependencies between user interface elements that visually represents components of an application. For instance, the user interface elements can represent functions to be executed in relation to a business process managed by the application, the dependencies can represent an order in which functions are performed to execute the overall business process. In another example, the visual development tools can include point-and-click creation tools that allow users to combine user interface elements representing functions to specify a task to be performed. For instance, the user can build an application that generates an expense report by pointing to and clicking accounting functions that are used to calculate financial parameters that are included in the expense report.

An application may involve performing operations by invoking one or multiple functions. For example, a word processing application can include a set of functions related to editing and modifying a document, as well as functions relating to accessing databases on which documents are stored and through which documents are accessed. The application can be configured such that the multiple functions have different dependencies based on how a certain function is executed by the application. For example, a function that enables word processing application to save a document in a network location can be dependent on the permissions of a user that accesses the network location. In this respect, while a function can be adjusted between different versions of an ADP, as discussed throughout, a prior version of a function may not necessarily be replaceable by the updated version of the function because, for instance, the two versions of the function can have different definitions that affect dependencies when executed by an application.

As discussed herein, an "expression" refers to a string of characters in a programming language (or scripting language) that define a function and are intended to return a value and/or perform a specified action. For example, an expression can represent a combination of elements, such as one or more explicit values, constants, variables, operators, and/or functions that the programming language interprets and computes to produce (or return in a "stateful" environment) another value. Evaluation of an expression refers to the interpretation and computation of the expression by the programming language to return the intended value. For example, an expression "2+3" defines a function "add( )" and is evaluated to produce an output with the value "5," which represents the output of the "add( )" function.

An expression, as discussed herein, can provide different types of output based on the combination of values, constants, variables, and/or operators. For example, an expression can return a numerical value of an arithmetic operation, e.g., "1+2" returning value "3." In another example, the expression can return a value representing a Boolean data type, e.g., "2<3" returning value "true." In some examples, the expression can return a value resulting from the evaluation of a program function, e.g., "read file('abc.txt')" returning value representing the contents of "abc.txt." In this regard, an expression can be adjusted to adjust the definition of a function. In some instances, an expression for a given function can be changed to produce a different version of the same function in, for example, a new release version of an ADP.

FIG. 1 illustrates an example of a system 100 that is capable of software versioning an ADP. The system 100 generally includes a developer system 110, a server system 120, and a client system 130 that exchange data communications over a network 105. The developer system 110 includes a developer application 112. The server system 120 includes an update processor 122 and an update executor 124 and stores a function transformation 126 and a function repository 128. The client system 130 includes a designer application 132.

In general, the exemplary process depicted in FIG. 1 involves updating an ADP according to an update 102 prior to a new release version of the ADP. In this example, the update 102 specifies an update to an existing function, "textField( )," which was previously defined in a prior version of the ADP. The update 102 updates the function and thereby provides improved functionality to applications that utilize the updated function in performing associated operations. However, as discussed above, because some applications involve multiple functions, an updated function may have different dependencies compared to an earlier version of the function. A user may therefore be reluctant to update the application to reference the updated function if, for instance, the updated function has different dependencies than the prior version of the function when incorporated into the application. Users with limited technical expertise would therefore be unable to fix an application that becomes inoperable due to a change in the version of a function that it references once a new version of the ADP is released for use.

As shown in FIG. 1, the server system 120 prepares update documentation 104 based on the update 102 and provides the update documentation 104 to the client system 130. The update documentation 104 enables the designer application 132 to determine that an existing application is potentially impacted by the updated function in the update 102 and provides the user with a notification 138 that allows the user to update the application to incorporate the updated function. As discussed below, in some instances where the user declines the update, the system 100 configures the ADP to provide backward compatibility with applications that use outdated versions of functions. In this regard, a user can continue to use applications developed on prior versions of the ADP even after the ADP has been updated through multiple release cycles. However, this may not be optimal as an update to an ADP may provide, for instance, performance enhancements, new capabilities, and/or error fixes through new functions that may improve an overall application. Continued use of a legacy application may therefore limit the ability to receive benefits and/or improvements offered by updated functions.

Referring now to the components of the system 100, the ADP can be a software platform that allows end-users, e.g., users of the client system 130, to design, develop, and deploy applications using a set of functions specified in the function repository 128. The ADP may be configured as a low-code application development platform that allows users to build applications without actually coding functions. For example, the ADP can allow users to configure applications through designer application 132 that provides access to pre-configured functions for executing certain tasks. In this regard, a user can use the ADP to build an application using a simplified text editor and without significant programming knowledge and/or skills. Examples of applications that can be built using the ADP are discussed below.

The developer system 110 is used by a user, e.g., a software developer, to develop software functions relating to the ADP. For example, the developer application 112 can be an integrated development environment (IDE) that enables a developer to create, modify, and test software upgrades to the ADP. The developer application 112 can be used to provide different software environments, such as a test environment, a deployment environment, and a production environment, to design and test features of the ADP. Specifically, developer application 112 can allow code, data, and configuration associated with a new release version of the ADP to be tested in a pre-production environment for testing prior to deployment to the server system 120 using the update 102.

The server system 120 can include one or more computing devices that run software and/or host services that support the ADP. For example, the server system 120 can include data centers that store application data associated with applications that are developed through the ADP, web servers that host a web-based application through which users can access the ADP, and/or application servers that allow a discrete application running on the client system 130 to access the ADP through an application package interface (API).

The server system 120 includes hardware and software components that support various functions associated with the ADP, such as creation of applications, testing of applications, execution of applications, updates to the ADP, upgrades to functions, among others. For example, in the context of an update to the ADP, the server system 120 includes an update processor 122 that processes an update 102 received from the developer system 110. As another example, the server system 120 also includes an update executor 124 that an application on the ADP to incorporate a function that has been updated in a new release of the ADP.

The server system 120 stores data that is used to implement an update to the ADP. For instance, the server system 120 stores a function transformation 126 that identifies associations between different versions of the same function, as discussed in more detail below with respect to FIGS. 3A-B. The function repository 128 includes a list of functions that are capable of being used to design applications using the ADP, as discussed in more detail below with respect to FIGS. 4A-B.

The client system 130 can be any type of computing device that is used to access the ADP. As examples, the client system 130 can be a laptop computing device, a desktop computing device, a tablet computing device, a smartphone, a mobile phone, a wearable device, or any other type of network-enabled computing device that includes a screen, e.g., a liquid crystal display (LCD) screen, to display user interfaces of the ADP. The client system 130 can be configured to receive input from users using input devices, e.g., touch screens, touch pads, mice, keyboards, etc., to interact with interfaces of the ADP presented for output on the display of the client system 130.

The client system 130 includes a designer application 132 that allows users, e.g., an end-user accessing the ADP, to design applications using features, toolkits, and features of the ADP. Specifically, as shown in FIG. 1, the designer application 132 can provide an interface 134 that allows users to specify the execution of functions by the application in a simplified format. As discussed above, the interface 134 can be configured such that the user can access data objects, functions, and other elements and configure an application without significant programming knowledge or software development expertise. For example, users can use the interface 134 to define a business process for an application by using a drag-n-drop process modeler to specify relationships between data objects without having to use programming language to define functions of the application.

Figure 2A:
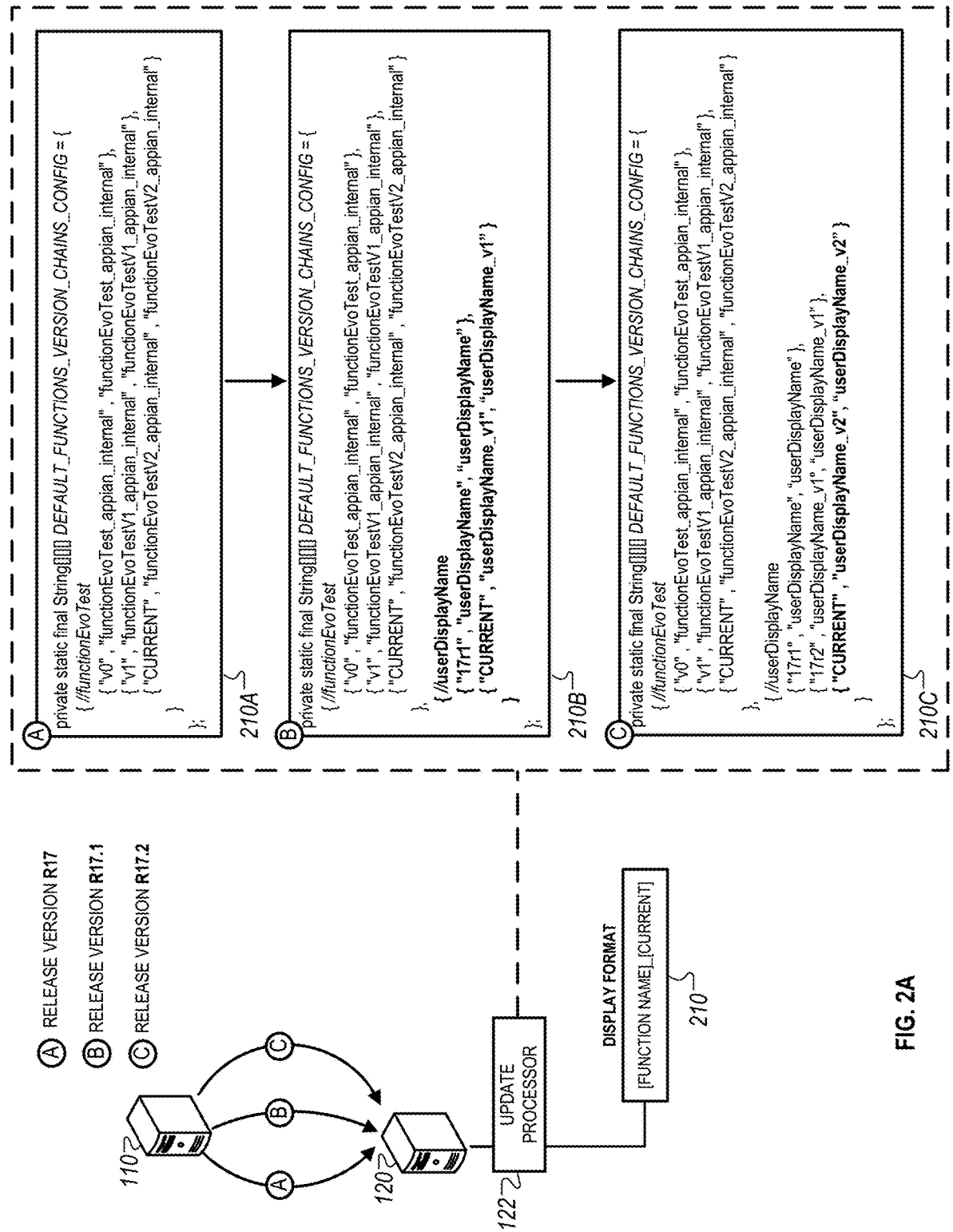
FIGS. 2A-B illustrate examples of techniques for generating data structures for different versions of the same function.
Figure 2B:
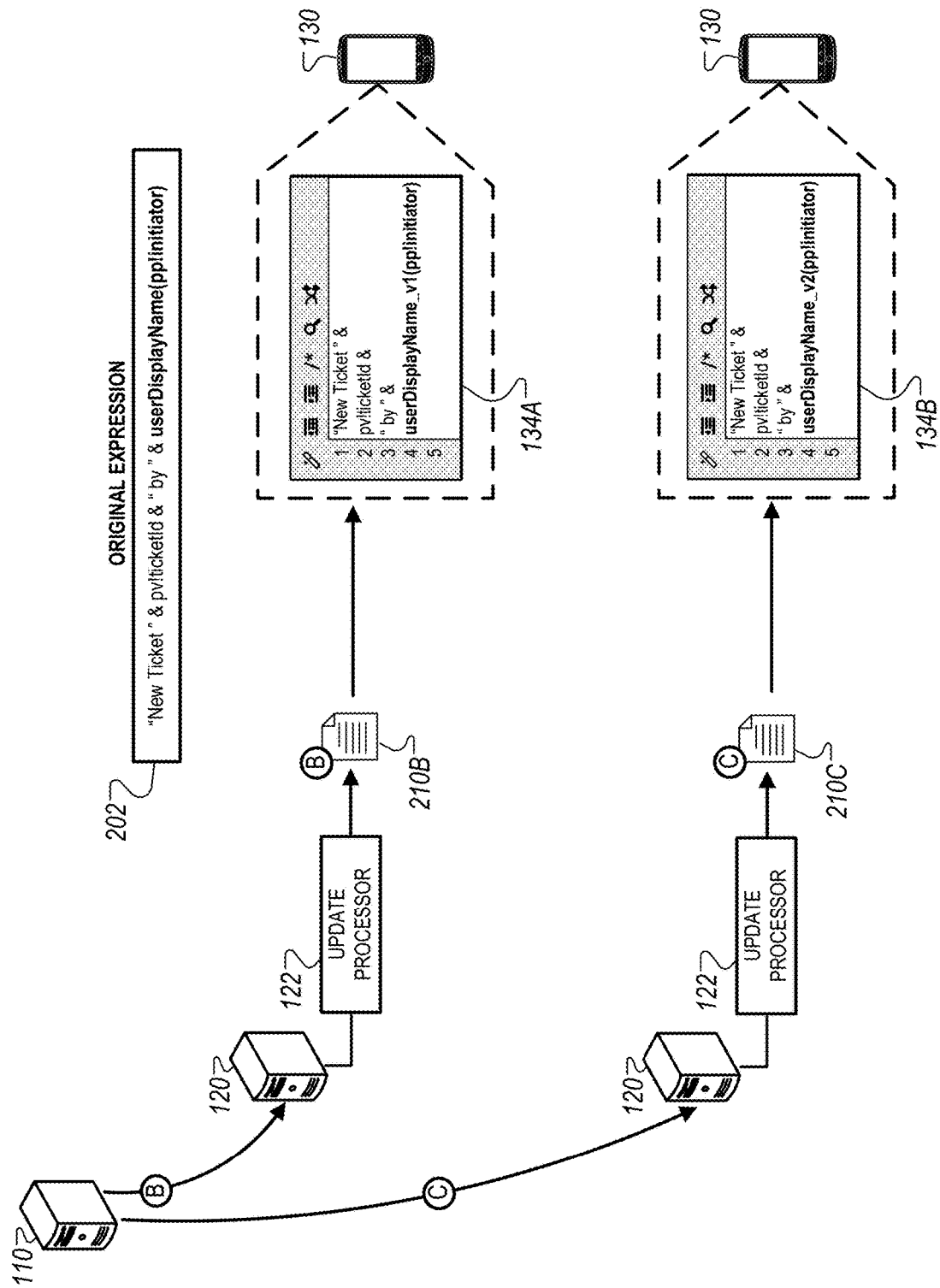

FIGS. 2A-B illustrate examples of techniques for generating data structures for different versions of the same function. Referring initially to FIG. 2A, an example of a technique for generating version specifications 210A, 210B, and 210C of a function across three release versions "R17," "R17.1," and "R17.2" of an ADP is depicted. In this example, a function "userDisplayName( )" is updated with each new release of the ADP at time points "A," "B," and "C."

During the update process, the update processor 122 of the server system 120 generates a version specification so that the ADP can distinguish between different versions of the function to provide backward compatibility with applications that incorporate older versions (i.e., prior versions) of the function. The update processor 122, in this example, implements a naming convention in which the function is displayed in the format of "[FUNCTION NAME]_[CURRENT]" where "[CURRENT]" represents the version number of the function.

With each new version of the function, the update processor 122 uses a corresponding specification to create a new function entry into the function repository 128. Each entry can be an array listing the canonical function name for each version, e.g., a function name and a display name suffix. For example, "userDisplayName( )" represents the first or original version of the function, whereas "userDisplayName_v1( )" represents the second or updated version of the function as specified under release "R17.1" of the ADP. Likewise, "userDisplayName_v2( )" represents a third version of the function as specified under release "R17.2" of the ADP.

As shown in FIG. 2A, once the release "R17.1" of the ADP is implemented, the update processor 122 updates specification 210A to generate specification 210B. In particular, the update processor 122 adds a portion of code that identifies the release of the updated ADP, e.g., "17," and identifies a display name suffix as representing the current version. The specification 210B therefore allows the function "userDisplayName_v1( )" to exist as a distinct entry from an entry for the function "userDisplayName( )," identifies that the function "userDisplayName_v1( )" is defined in release "17r1" of the ADP, and presently represents the most up-to-date version of the "userDisplayName" function.

A similar process as discussed above is used for subsequent releases of the ADP that specify updated definitions for the same function. For example, once the release "R17.2" of the ADP is implemented, the update processor 122 updates specification 10B to generate specification 210C. In particular, the update processor 122 adds a portion of code that identifies function "userDisplayName_v2" as representing the current version of the function and that the function corresponds to release version "17r2."

The iterative updates to the version specifications, as shown in FIG. 2A, allows the system 100 to not only distinguish between distinct iterations of functions, e.g., "userDisplayName," "userDisplayName_v1," "userDisplayName_v2," but also track the progress of updates between updates to a function through various releases of the ADP, e.g., "R17.0," "R17.1," and "R17.2." In this respect, the system 100 is capable of identifying differences between multiples versions of the function and, in some instances, evaluate the identified differences to determine potential performance enhancements to existing applications that were built using prior versions of functions and using prior release versions of the ADP.

Referring now to FIG. 2B, an example of a technique for adjusting display formats of a function using version specifications is depicted. In the example, the display format of an expression 202 for a function "userDisplayName( )" is dynamically adjusted with each new release of the ADP at time points "B" and "C."

As discussed above in reference to FIG. 2A, the update processor 122 generates version specifications 210B and 210C for a function based on updates identifying updates to an existing function. In the example shown in FIG. 2B, the version specifications are then used to dynamically adjust the display format of a corresponding function while a user edits an application in the designer application 132. This process can be performed automatically (i.e., with minimal or no human intervention) so that a user is aware of possible new versions of a function when configuring an application that includes outdated functions in the designer application 132.

As shown in FIG. 2B, the original expression prior to time point "B," e.g., prior to the release version "R17.1" of the ADP, includes a reference to an original version of the function "userDisplayName( )." The reference then invokes a corresponding function in the function repository 128. Once release version "R17.1" of the ADP is implemented at time point "B," the version specification 210B is used generated to reflect an updated version of the function that was added to the function repository 128 during implementation of the release version "R17.1." Then, once the user accesses an interface 134A of the designer application 132, the reference to the outdated version of the function, i.e., "userDisplayName( )," is updated to reference text corresponding to a name of the current version of the same function, i.e., "username_v1." As discussed above, because the designer application 132 allows users to build and configure applications using expressions that can represent programming language, the change in the display format of the function as shown in the interface 134A is only to visually indicate to the user that a new version of an existing function is available. The execution of the specified expression, as discussed below, can be performed to ensure that the application executes properly through the ADP. Additionally, a user is shielded from the complexity otherwise involved in updating a function within an application since the change is simply represented in the designer application 132 as a change to the display format of the function in an expression.

In some implementations, the adjustment in the display format of a function is accompanied by a notification indicating that a new version of a function is available for use with an application. For example, as shown in FIG. 1, the notification 138 is presented to the user through the designer application 132 to allow the user to obtain release information about the updated version of a function while accessing an expression that references the function. In such implementations, the update processor 122 does not adjust the display format of a function reference in an expression, as shown in FIG. 2B, but includes another modifier or modifier, e.g., an asterisk, a color modifier, that is associated with a popup notification. The popup notification can be displayed when, for example, the user moves his mouse or cursor in a location of the editor that coincides with the function reference.

In some instances, updating an expression of an application to reference an updated version of a function can simply involve replacing a reference to an earlier version of the function with a reference to an updated version of the function, e.g., replacing "userDisplayName( )" with "userDisplayName_v1( )" in the original expression 202. In such instances, the number of dependencies of a function within an expression may be limited such that replacing a reference to an outdated version of a function with a reference to an updated version of the function may have minimal or no impact on evaluation of the expression. Alternatively, the update processor 122 can determine that the update to the function is of the type that is unlikely to break the application if an expression is adjusted to reference the updated version, then the update processor 122 automatically adjusts to expression and provides the user with a notification indicating the changes to the function. For example, if the update to function is to provide additional capabilities that are not present in the prior version, e.g., compatibility with new data types, then the update processor 122 determines that the updated version of the function only provides additional capabilities but is not likely to break the use of the older version of the function in the application.

Figure 3A:
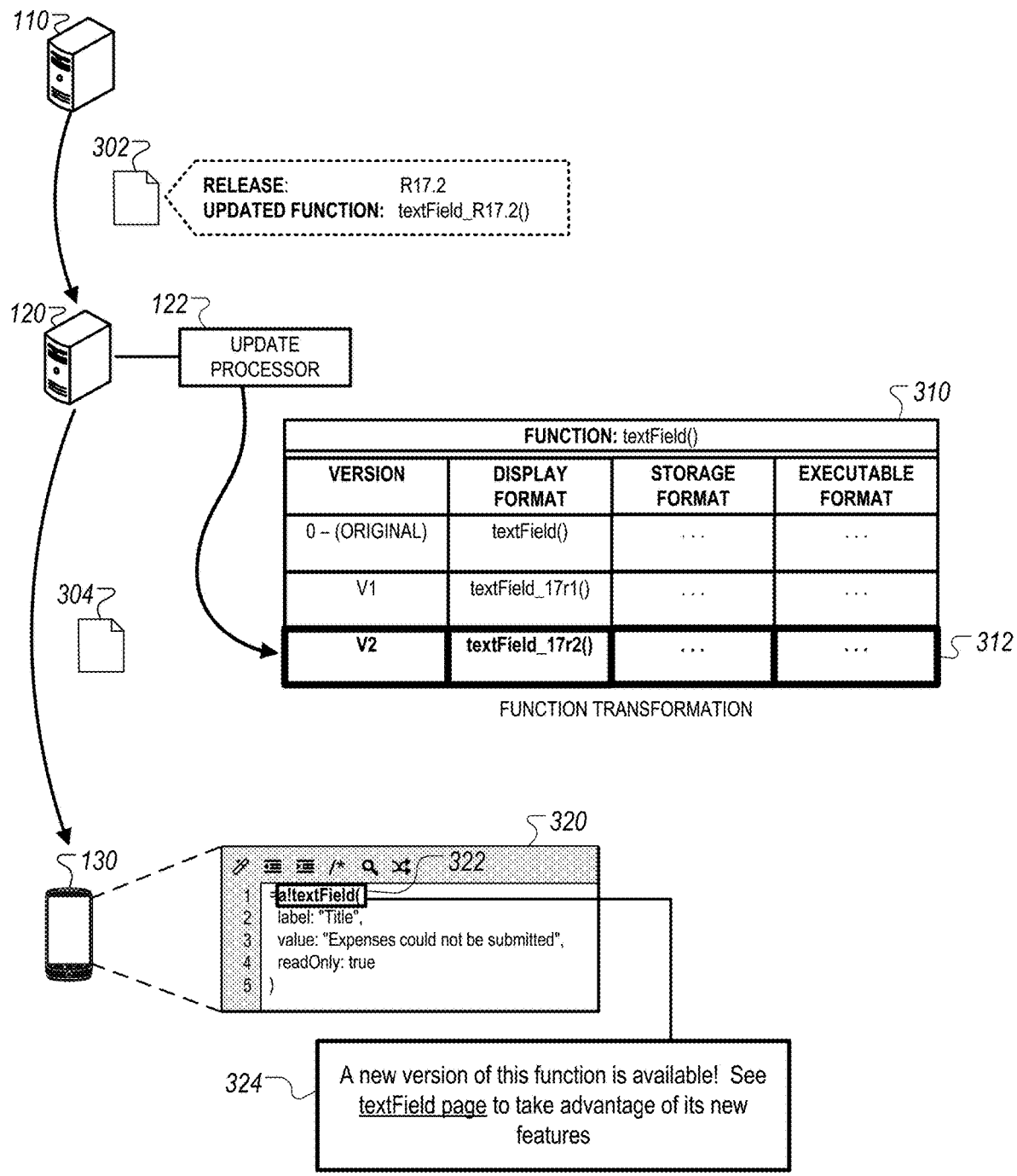
FIG. 3A illustrates an example of a technique for maintaining a function transformation repository that associates different versions of the same function between different versions of an ADP.

FIG. 3A illustrates an example of a technique for maintaining a function transformation 310 that associates different versions of the same function between different versions of an ADP. In the example, the developer system 110 initially provides data indicating an update 302 to the server system 120. The update 302 identifies a current release of the ADP, e.g., "R17.2," and a function that exists in a prior release of the ADP and has been updated in the current release, e.g., "textField" function.

Once the server system 120 receives the update 302, the update processor 122 updates a function transformation 310 for the "textField" function. The function transformation 310 can be a data structure that allows the system 100 to track multiple instances of a function as updated through different versions of the ADP. For example, in some implementations, the function transformation 310 can be a look-up table in a database. In this example, the look-up table that includes data columns representing different pieces of information and rows representing an entry for each version of the function.

The function transformation 310 includes an entry for each version of a function that is identified by the update processor 122 through different releases of the ADP. Each entry within the function transformation 310 identifies a corresponding function version, and different data structures associated with the function version, such as a display format, a storage format, and an executable format. The display format can be a universally unique identifier that references a function within an expression displayed on the designer application 132. As discussed above, the display format of a function can be used as a reference to data objects that enables a computing device to invoke the function through the ADP. The storage format can represent source code of the function in an appropriate programming language. For example, the storage format can include programming logic that is used by the computing device to interpret and evaluate an expression that references a given function. The executable format can represent compiled programming language, e.g., machine code that is compiled and/or translated from source code. For example, the executable format can be low-level programming language that is executed by a computing device when performing operations specified by a function.

The system 100 can use the function transformation 310 to generate associations between different versions of a certain function and provide inter-operability between releases of the ADP. This ensures that an application that was developed using a prior release of the ADP can property function on an updated release of the ADP. Additionally, since the function transformation 310 tracks the display formats, storage formats, and executable formats of multiple versions of a function, the system 100 can evaluate a predicted impact of adjusting an application to replace a prior version of a function with an updated version of the function. As a simplistic example, when evaluating an expression that references a prior version of a function, the system 100 can replace a portion of application code corresponding to the prior version of the function with executable format of the updated version of the function and then determine whether application performance is degraded. In this example, the evaluation of the modified application code can be performed on an automated basis, i.e., without manual user input during the update process, or during the design process when a user adjusts an application after a new release of the ADP.

Once the update processor 122 has added the entry 312 to the function transformation 310, the server system 120 generates release documentation 304 and provides the release documentation 304 to the client system 130. The release documentation 304 references associations between different versions of the function, which consequently allow the client system 130 to determine whether an existing application accessed or otherwise used by a user through the ADP is potentially impacted by the update 302. In some instances, where the ADP is accessed through a web-based application, the client system 130 can use the release documentation 304 identify impacted applications once a user logs into the web-based application. In other instances, where the ADP is accessed through a mobile application running on the client system 130, the release documentation 304 includes instructions, when received by the client system 130, causes the mobile application to determine whether applications developed on the ADP are potentially impacted by the release.

In the example depicted in FIG. 3A, the client system 130 uses the release documentation 304 to determine that an expression within an application being edited by a user on an interface 320 of the designer application 132 includes a reference to a version of a function "textField" that has recently been changed in the update 302. In this example, the system 100 determines that the existing reference to the function is an outdated version since the function transformation 310 includes the entry 312 designating a version that was updated in the most recent release of the ADP as being the current version of the function. Based on this determination, the designer application 132 displays an indicator 322 in a region of the editor that coincides with the reference to the function "textField( )." In this example, once the user interacts with the indicator 322, e.g., by moving a mouse the over to the region of the editor, providing a touch input in the region of the editor, etc., the designer application 132 displays a notification 324. As discussed above with respect to FIG. 1, the notification 324 informs the user that a new version of the function "textField" is available and includes a hyperlink that, when selected, redirects the user to a webpage that provides information associated with the updated version of the function, e.g., "textField_17r2( )."

Figure 3B:
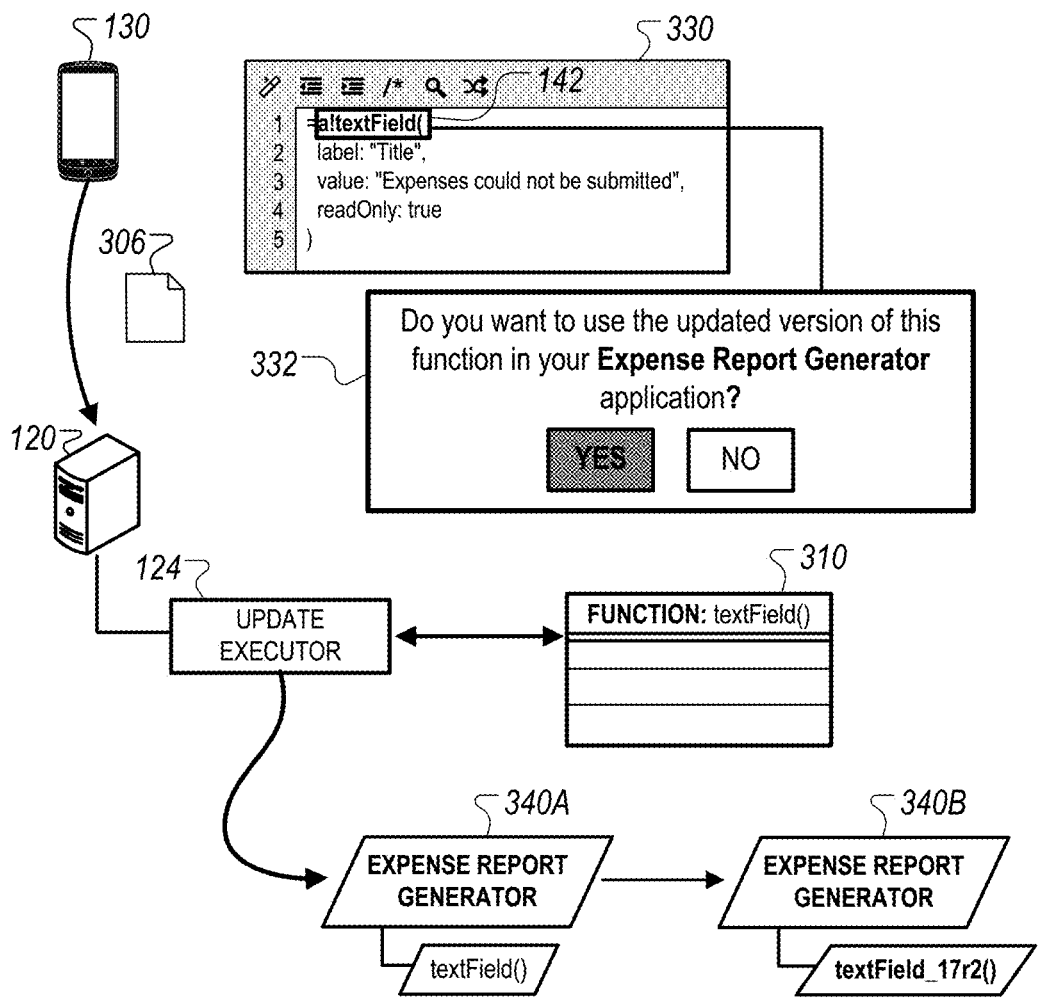
FIG. 3B illustrates an example of a technique for updating an application to incorporate an updated version of an existing function included in a new version of an ADP.

FIG. 3B illustrates an example of a technique for updating an application to incorporate an updated version of an existing function included in a new version of an ADP. In this example, the system 100 updates an application "Expense Report Generator" that was built on a prior release of the ADP and using an outdated version of the function "textField." Once the system 100 has determined that an expression of the application includes a reference to the outdated version of a function, the designer application 132 presents a notification 332 requesting the user if he/she would like to update the application to incorporate an updated version of the function. The user then selects an option to update the application through the notification 332.

The client system 130 provides an indication 306 of the user's selection to the server system 120. The update executor 124 of the server system 120 then accesses the function transformation 310 to identify the version of the function that is referenced in the current application and the current version of the function, i.e., the version of the function that has been updated in the most recent ADP release. The update executor 124 then updates source code for application 340A to generate an updated application 340B that references the updated version of the function.

As shown in FIG. 3B, the update executor 125 generates the application 340B by replacing references to function "textField( )" in application 340A are function "textField_17r2( )." In some instances, the replacement involves adjusting source code for an application by replacing a portion of the source code that references one function with code that then references the second function. This can be performed as a backend and without user input so that the user perceives the update process as a simple update to the front-end designer element that references a corresponding version of a function. In such instances, the use of a certain function in the source code may have a limited number of dependencies such that replacement does not impact the operability of the application as a whole. In other instances, where a function has a large number of dependencies to other functions and/or data objects, the update executor 124 may identify debugging and testing procedures for the updated application 340B to ensure that performance and/or operability of the original application is not impacted by the change in the function that is referenced in the application source code. The debugging and testing procedures can be identified based on a comparison of the storage and executable formats of the two versions of a function to identify ways in which the two versions of the function perform differently in the ADP.

FIG. 4A illustrates an example of a user interface 410 that allows a user to access information for an updated version of an existing function in a new version of an ADP. In this example, the interface 410 displays release information for a "textField" function that has been updated in a recent release of the ADP. As discussed above in reference to FIGS. 1 and 3A, a user can be directed to the user interface 410 once he/she selects to view release information for an updated function through, for example, the notifications 138 and 324. In these examples, a notification that includes a hyperlink to the user interface 410 is selectable by a user to view updates to an existing function within the ADP. As shown in FIG. 4A, the interface 410 includes a list of parameters 412 for executing the function. In particular, the parameters include a label, a label position, and alignment for text to be displayed on a single line of text when executing the function. The interface 410 also includes release notes that inform the user on improvements and changes to the function in the current release of the ADP. The user can use the information in the user interface 410 to determine possible advantages in incorporating an updated version of a function with an existing application.

FIG. 4B illustrates an example of a user interface 420 that displays a list of functions 422 stored in the function repository 128. In this example, the list 422 identifies functions referenced in the current release of an ADP, including newly added functions and updated versions of existing functions from prior releases. For example, as shown in FIG. 4B, the list 422 includes a record 422A for an updated version of a function that adjusts a technique for joining multiple arrays. The interface 420 can be used by a user to, for example, search for a function to use when building an application, determine if there have been any updates to a function, or compare functions that can be used as alternates of one another.

Figure 5:
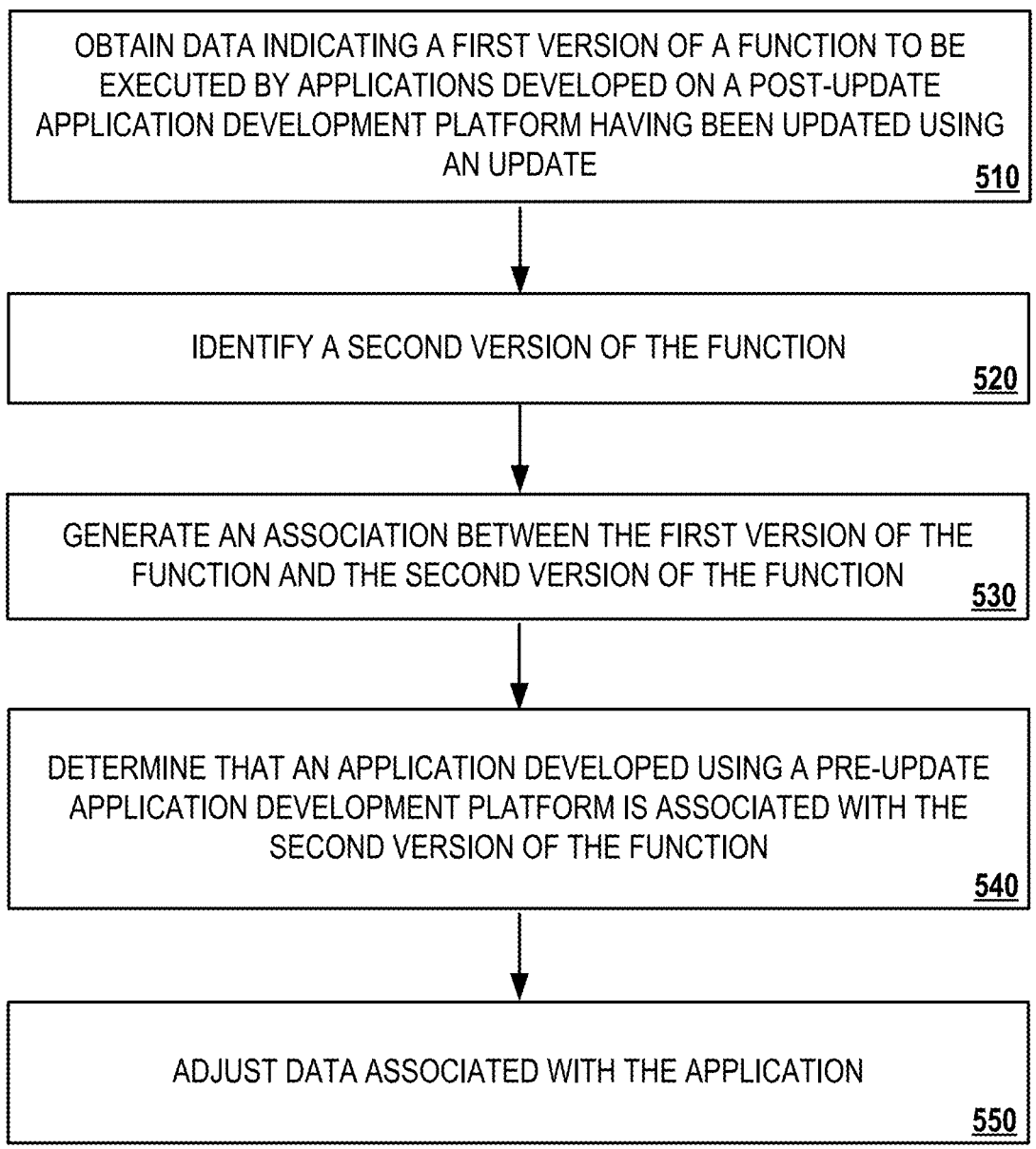
FIG. 5 illustrates an example of a process for adjusting an existing application based on an updated function included in a new version of an ADP.

FIG. 5 illustrates an example of a process 500 for adjusting an existing application based on an updated function included in a new version of an application development platform. Briefly, the process 500 can include the operations of obtaining data indicating a first version of a function to be executed by applications developed on a pre-update application development platform having been updated using an update (510), identifying a second version of the function (520), generating an association between the first version of the function and the second version of the function (530), determining that an application developed using a pre-update application development platform is associated with the second version of the function (540), and adjusting data associated with the application (550).

In general, the process 500 is discussed below in reference to the system 100, although any system associated with an ADP can be configured to perform the operations discussed below. For example, a system that allows users to build applications in simplified development environment can be configured such that updates to existing functions in new releases of an ADP are tracked through a data structure, such as the function transformation 310 discussed above. Additionally, the operations of the process 500 can be executed by a single component of the system 100, or alternatively, by multiple components depending on a specific implementation of the concepts disclosed herein. For example, in some implementations, where users access and use the ADP through a web-based application, i.e., as a "thin-client application," the operations of the process 500 can be performed exclusively by the server system 120. In other implementations, where the client system 130 runs a mobile application that accesses services and data objects associated with the ADP through an API, the operations of the process 500 can be performed by a combination of the server system 120 and the client system 130. The descriptions below reference the server system 120 performing the operations of the process 500 for simplicity and should not be understood as limiting the concepts discussed in the present disclosure.

In more detail, the process 500 can include the operations of obtaining data indicating a first version of a function to be executed by applications developed on an post-update application development platform having been updated using a update (510). For example, the first version of the function can be a version that is included in a new release of the ADP, i.e., a post-update ADP. As discussed above, functions can be incorporated into applications that are built by users on the ADP to perform certain operations, such as generating a transaction report. In one particular example, the ADP allows business users, i.e., users without significant programming knowledge, to build business process management applications in a simplified programming environment where links between data objects, functions, and data sources can be formed using a drag-and-drop interface to create logical expressions. An expression can reference a function, which, when evaluated, results in execution of the function.

As discussed above, the ADP can enable user interfaces that permit a user with limited technical experience, e.g., business users with limited or no programming or software engineering expertise, to build applications in a simplified programming environment.

For example, the interfaces enabled by the ADP can allow users to build applications by specifying relationships between visual development tools that simulate programming logic for source code of an application. As an example, the visual development tools can include a drag-and-drop modeler that allows users to build dependencies between user interface elements that visually represents components of an application. For instance, the user interface elements can represent functions to be executed in relation to a business process managed by the application, the dependencies can represent a order in which functions are performed to execute the overall business process. In another example, the visual development tools can include point-and-click creation tools that allow users to combine user interface elements representing functions to specify a task to be performed. For instance, the user can build an application that generates an expense report by pointing to and clicking accounting functions that are used to calculate financial parameters that are included in the expense report.

The process 500 can include the operation of identifying a second version of the function (520). For example, the second version of a function can be a version of the function that was included in a prior release of the ADP, i.e., a pre-update ADP. As discussed above in FIGS. 2A-B, the updated version of the function can add new capabilities to an existing function in a prior release of the ADP, improve existing capabilities of the existing function, or correct errors or bugs that users have experienced with the function when using the prior release of the ADP. The second version of the function is identified so that the server system 120 can, for example, identify how a new release of the ADP can potentially improve applications that have been previously developed using an older release of the ADP.

The process 500 can include the operation of generating an association between the first version of the function and the second version of the function (530). For example, the association can be a data structure that represents similarities and differences between a current version of a function, e.g., a version specified in a new release of the ADP, and prior versions of the function, e.g., versions specified in prior releases of the ADP. The association can be stored as the function transformation 310 as discussed above and depicted in FIG. 3A. The function transformation 310 can identify, for each version of the function, an associated ADP release, e.g., the release in which a function was created, a display format, e.g., a label to be used when referencing the function in the designer application 132, a storage format, e.g., source code for the function itself, and an executable format, e.g., compiled code that is executed by a computing device. As discussed above, the function transformation 310 enables the server system 120 to identify differences between versions of the same function to identify possible improvements in the capabilities of existing applications that were developed prior to the introduction of a new release of the ADP and a new version of a function that is referenced in the existing applications. In some implementations, the association is stored as a look-up table in one or more databases associated with the ADP. In such implementations, the server system 120 can store a look-up table for each function identified in the function repository 128. The association between version of functions therefore provides a technique to identify the progression of a given function through multiple releases of the ADP.

The process 500 can include the operation of determining that an application developed using a pre-update application development platform is associated with the second version of the function (540). For example, the server system 120 can identify an application that was built on a prior release of the ADP and incorporates a prior version of a function that has been updated in the most current release of the ADP. As discussed above, the server system 120 identifies the application based, for example, using a display format specified in the association to identify applications that include expressions referencing prior versions of the function. In other examples, the application can be identified once a user accesses the designer application 132 and begins editing expressions associated with the application.

The process 500 can include the operation of adjusting data associated with the application (550). As discussed above, the server system 120 can perform different types of adjustments using the association between different versions of a function. As one example, when a user is editing an expression of an application that references a prior version of the function, the server system 120 can adjust a display of text strings for the prior version such that it displays a display format of the updated version of the function, as shown in FIG. 2B. This technique shields the user from complexity associated with the function update process, which, from the user's perspective, provides a smooth update process that involves limited technical expertise to carry out. As described throughout, because the ADP is used to allow users to build and maintain applications without programming knowledge or expertise, a simplified update process enables a user to update legacy applications without demanding that the user have programming sophistication. As another example, the server system 120 can provide an indicator that draws a user's attention to the function, and allows the user to receive an indication that an update to the function is available in the most release of the ADP, as shown in FIGS. 1 and 3B. In yet another example, in some instances where a function has limited dependencies within an expression and/or application, the server system 120 can automatically replace references to a prior version of a function with references to an updated version of the function, and then execute performance tests to confirm whether the adjusted expression or application can be properly executed with the modification.

In some implementations, the process 500 can include additional operations. For example, the process 500 can include operations relating to updating the function transformation 310 after the server system 120 has received an indication that the ADP has been updated to a new release version, as discussed above in reference to FIG. 3A. In such examples, the update processor 122 of the server system 120 accesses the current function transformation 310, obtains information from the update 302 of the release version to identify information associated with a new version of a function, and then adds a new entry 312 into the function transformation 310 so that it includes information for the updated version of the function. As shown in FIG. 3A, once the function transformation 310 has been updated, it includes an entry for a current version of the function as well as entries for prior versions that were introduced in prior releases of the ADP.

In some implementations, the interfaces that permit the user to build the application includes a designer interface, e.g., the interface 134, that allows a user to specify relationships between visual data objects of an application. In the example shown in FIG. 1, the visual data objects are text strings that reference a given function. In this example, the text string "a!textField( )" is a reference to the "textField" function so that a computing device invokes and execute the function when the expression in the interface 134 is evaluated. In other examples, the visual data objects can be graphical objects, such as include icons, pictures, buttons, etc., that are clickable and/or can be dragged through the interfaces of the ADP. In such implementations, the designer interface displays a visual data object that references the second version of the function and adjusting the data associated with the application includes adjusting the visual data object for the function such that the visual data object references the first version of the function. For instance, in the example shown in FIG. 2B, the interfaces 134A and 134B, once the update processor 122 has generated the release documentation 210B, the designer interface is updated such that a reference to the "userDisplayName" in the original expression 202 is automatically updated to reference the updated function "userDisplayName_v1."

Figure 6:
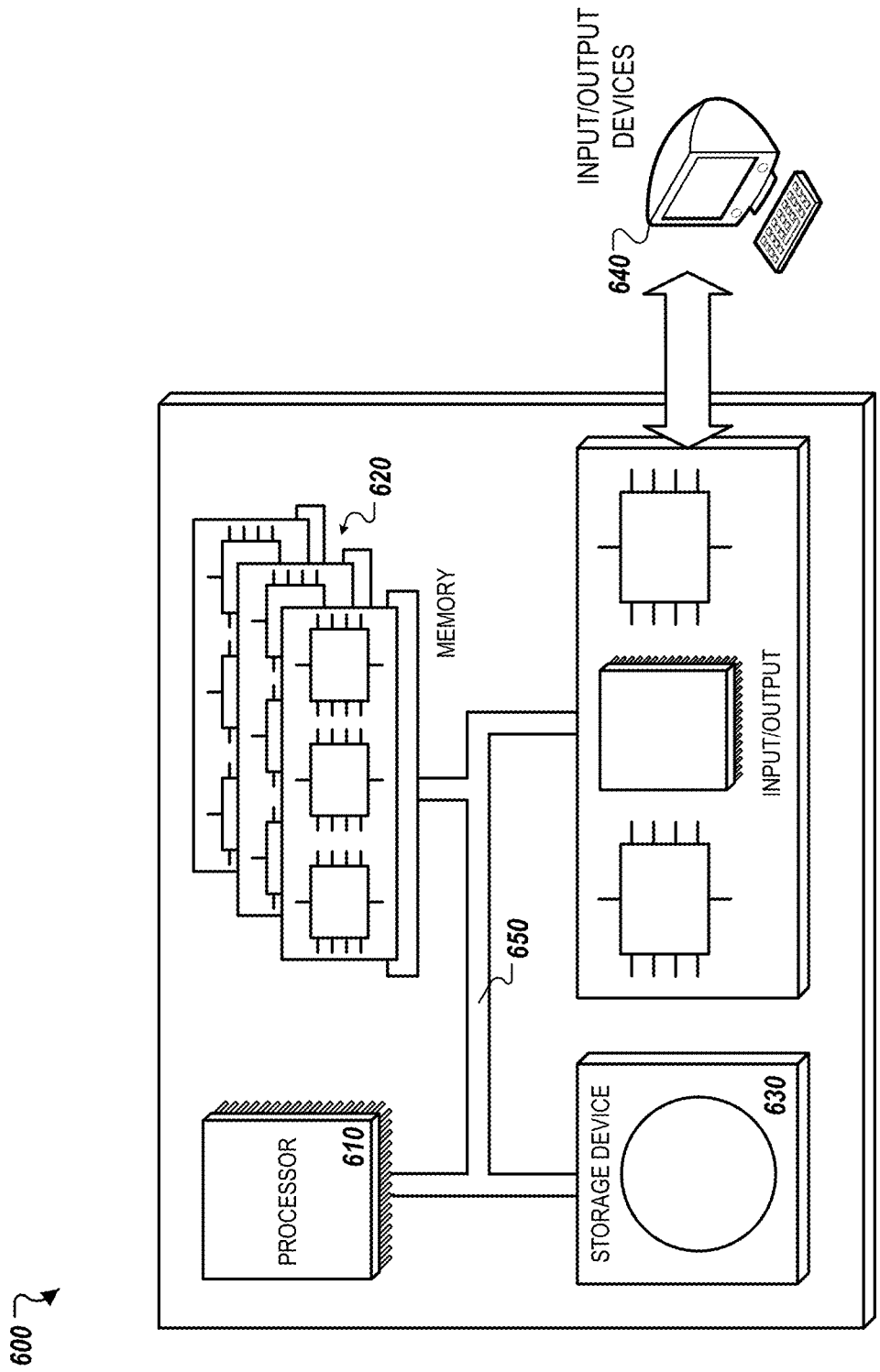
FIG. 6 illustrates a schematic diagram of a computer system that may be applied to any of the computer-implemented methods and other techniques described herein.

FIG. 6 illustrates a schematic diagram of a computer system 600 that may be applied to any of the computer-implemented methods and other techniques described herein. The system 600 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 640. The processor 610 is capable of processing instructions for evaluation within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for evaluation by a programmable processor; and method steps can be performed by a programmable processor evaluating a program of instructions to perform functions of the described implementations by operating on input data and generating output. The described features can be implemented advantageously in one or more computer programs that are evaluatable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the evaluation of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for evaluating instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
    identifying a function to be executed by an application on a post-update application development platform, the post-update application development platform having been updated from a pre-update application development platform using an update, the update specifying at least one new result associated with execution of the function on the post-update application development platform;
    determining that the function to be executed was available to be executed on the pre-update application development platform, wherein a result associated with execution of the function on the pre-update application development platform is different from the at least one new result; and
    providing a notification including a link that, when selected by a user, redirects the user to a webpage producing the result associated with execution of the function on the pre-update application development platform.

2. The method of claim 1, wherein the post-update application development platform is configured to enable a user interface for building an application by specifying one or more relationships between visual development tools.

3. The method of claim 2, wherein the visual development tools comprise at least one of drag-and-drop modelers or point-and-click interface creation tools.

4. The method of claim 2, wherein the user interface permits a user to build the application without writing source code for the application.

5. The method of claim 1, further comprising:
    based on determining that the function to be executed was available to be executed on the pre-update application development platform, identifying one or more definitions of a version of the function configured to be executed on the post-update application development platform; and
    updating a function repository of the post-update application development platform to include the one or more definitions of the version of the function.

6. The method of claim 5, wherein:
    the function repository comprises a respective data structure for each function to be executed by applications developed on the post-update application development platform; and
    each data structure comprises, for each of the functions to be executed by applications developed on the post-update application development platform, a display format, a storage format, and execution parameters.

7. A system comprising:
    one or more processors; and
    one or more non-transitory computer-readable storage devices storing instructions that are executable by the one or more processors to perform operations comprising:
        identifying a function to be executed by an application on a post-update application development platform, the post-update application development platform having been updated from a pre-update application development platform using an update, the update specifying at least one new result associated with execution of the function on the post-update application development platform;

determining that the function to be executed was available to be executed on the pre-update application development platform, wherein a result associated with execution of the function on the pre-update application development platform is different from the at least one new result; and providing a notification including a link that, when selected by a user, redirects the user to a webpage producing the result associated with execution of the function on the pre-update application development platform.

8. The system of claim 7, wherein the post-update application development platform is configured to enable a user interface for building an application by specifying one or more relationships between visual development tools.

9. The system of claim 8, wherein the visual development tools comprise at least one of drag-and-drop modelers or point-and-click interface creation tools.

10. The system of claim 8, wherein the user interface permits a user to build the application without writing source code for the application.

11. The system of claim 8, wherein the operations further comprise:

based on determining that the function to be executed was available to be executed on the pre-update application development platform, identifying one or more definitions of a version of the function configured to be executed on the post-update application development platform; and updating a function repository of the post-update application development platform to include the one or more definitions of the version of the function.

12. The system of claim 11, wherein:

the function repository comprises a respective data structure for each function to be executed by applications developed on the post-update application development platform; and each data structure comprises, for each of the functions to be executed by applications developed on the post-update application development platform, a display format, a storage format, and execution parameters.

13. At least one non-transitory computer-readable storage device storing instructions that, when executed by one or more processors, cause the one or more processors to perform operations comprising:

identifying a function to be executed by an application on a post-update application development platform, the post-update application development platform having been updated from a pre-update application development platform;

determining that the function was developed for execution on the pre-update application development platform;

based on determining that the function was developed for execution on the pre-update application development platform:

identifying one or more definitions of a version of the function configured to be executed on the post-update application development platform; and updating a function repository of the post-update application development platform to include the one or more definitions of the version of the function.

14. The non-transitory computer-readable storage device of claim 13, wherein the post-update application development platform is configured to enable a user interface for building an application by specifying one or more relationships between visual development tools.

15. The non-transitory computer-readable storage device of claim 14, wherein the visual development tools comprise at least one of drag-and-drop modelers or point-and-click interface creation tools.

16. The non-transitory computer-readable storage device of claim 14, wherein the user interface for building the application permit a user to build the application without writing source code for the application.

17. The non-transitory computer-readable storage device of claim 13, wherein configuring the application to execute the function on the post-update application development platform comprises providing a notification comprising a link that, when selected by a user, redirects the user to a webpage associated executing the function on the post-update application development platform.

18. The one non-transitory computer-readable storage device of claim 13, wherein the one or more definitions comprise one or more executable formats of the version of the function.

* * * * *